US008611192B2

(12) United States Patent
Balter et al.

(10) Patent No.: US 8,611,192 B2
(45) Date of Patent: Dec. 17, 2013

(54) ELAPSED TIME CLOCK

(75) Inventors: Nancy Balter, Culver City, CA (US); Yuen Po Man, Tai Po (HK)

(73) Assignee: Learning Resources, Inc., Vernon Hills, IL (US)

( * ) Notice: Subject to any disclaimer, the term of this patent is extended or adjusted under 35 U.S.C. 154(b) by 27 days.

(21) Appl. No.: 13/487,035

(22) Filed: Jun. 1, 2012

(65) Prior Publication Data

US 2012/0307599 A1 Dec. 6, 2012

Related U.S. Application Data

(60) Provisional application No. 61/492,242, filed on Jun. 1, 2011.

(51) Int. Cl.
*G09B 19/02* (2006.01)

(52) U.S. Cl.
USPC .............................. 368/80; 368/228; 434/304

(58) Field of Classification Search
USPC ........... 368/107, 71, 96, 76, 228, 80; 434/304
See application file for complete search history.

(56) References Cited

U.S. PATENT DOCUMENTS

| | | | | | |
|---|---|---|---|---|---|
| 634,983 | A | * | 10/1899 | King | 368/96 |
| 1,951,391 | A | * | 3/1934 | Borst | 368/96 |
| 2,191,770 | A | * | 2/1940 | Moss | 368/96 |
| D142,911 | S | | 11/1945 | Shrier | |
| 2,837,838 | A | * | 6/1958 | Lewis | 434/304 |
| D215,951 | S | | 11/1969 | Arato et al. | |
| 3,508,350 | A | | 4/1970 | Genin | |
| D256,807 | S | | 9/1980 | McLean | |
| 4,273,541 | A | | 6/1981 | Ishiyama | |
| 4,464,060 | A | * | 8/1984 | Schneider | 368/96 |
| 5,420,830 | A | * | 5/1995 | Camaratta et al. | 368/96 |
| D377,949 | S | | 2/1997 | Woldenberg et al. | |
| 5,851,118 | A | | 12/1998 | Woldenberg et al. | |
| 5,863,205 | A | * | 1/1999 | Martens | 434/304 |
| 6,071,124 | A | * | 6/2000 | Ang et al. | 434/304 |
| 6,385,138 | B1 | * | 5/2002 | Renton | 368/229 |
| D473,901 | S | | 4/2003 | Stoneberg | |
| 7,121,833 | B2 | * | 10/2006 | Brown et al. | 434/304 |
| 7,236,430 | B2 | | 6/2007 | Brown et al. | |
| 7,515,509 | B2 | * | 4/2009 | Klein | 368/223 |
| 2004/0037169 | A1 | * | 2/2004 | Fondin et al. | 368/96 |
| 2005/0265128 | A1 | * | 12/2005 | Shields | 368/71 |
| 2007/0147182 | A1 | * | 6/2007 | Witchey et al. | 368/223 |

OTHER PUBLICATIONS

"Big Time Learning Clock, 12-Hour Demonstration Clock" Learning Resources, Inc. (available prior to Feb. 3, 2011).
"Judy Discovery Clock" Judy/Instructo Company (available prior to Feb. 3, 2011).

(Continued)

*Primary Examiner* — Sean Kayes
(74) *Attorney, Agent, or Firm* — Michael Best & Friedrich LLP

(57) ABSTRACT

The present invention provides a clock having a body with a first clock face and a second clock face. The clock includes a start time assembly at least partially positioned within the body and corresponding with the first clock face, an end time assembly at least partially positioned within the body and corresponding with the second clock face, and an elapsed time assembly in mechanical communication with both the start time assembly and the end time assembly.

18 Claims, 18 Drawing Sheets

(56) References Cited

OTHER PUBLICATIONS

"Magnetic Big Time Learning Clock: 13" Learning Resources, Inc. (available prior to Feb. 3, 2011).
"Primary Time Teacher 12-Hour Learning Clock" Learning Resources, Inc. (available prior to Feb. 3, 2011).
"Talking Clever Clock" Learning Resources, Inc. (available prior to Feb. 3, 2011).

* cited by examiner

ELAPSED TIME CLOCK

CROSS-REFERENCE TO RELATED APPLICATIONS

This application claims the benefit of and priority to U.S. Provisional Patent Application No. 61/492,242 filed Jun. 1, 2011, the entire contents of which are hereby incorporated by reference.

FIELD OF THE INVENTION

Exemplary embodiments of the present invention are generally related to a teaching aid for children. More particularly, in some exemplary embodiments, the present invention provides a teaching aid to help children learn how to tell time.

BACKGROUND

Learning to tell time is an important part of a child's development. Lessons directed toward reading digital and analog clock faces are integral parts of many school curriculums. During those sessions, many teachers require an interactive way for students to both read various styles of clock and determine the elapsed time between different times.

SUMMARY

In some embodiments, the invention provides a clock having a body with a first clock face and a second clock face. The clock also includes a start time assembly at least partially positioned within the body and corresponding with the first clock face, an end time assembly at least partially positioned within the body and corresponding with the second clock face, and an elapsed time assembly in mechanical communication with both the start time assembly and the end time assembly.

In another embodiment, the invention provides a clock having an elapsed time assembly including an elapsed time dial with indicia thereon, a start time assembly in mechanical communication with the elapsed time assembly. The start time assembly has a first minute hand, and clockwise movement of the first minute hand rotates the elapsed time dial in a first direction. The clock also includes an end time assembly in mechanical communication with the elapsed time assembly, the end time assembly having a second minute hand, and clockwise movement of the first minute hand rotates the elapsed time dial in a second direction opposite the first direction.

In still another embodiment, the invention provides a clock having a body with a first clock face and a second clock face. The clock also includes an elapsed time assembly including an elapsed time dial with indicia, a start time assembly in mechanical communication with the elapsed time assembly, the start time assembly having a first minute hand proximate the first clock face where clockwise movement of the first minute hand rotates the elapsed time dial in a first direction; and an end time assembly in mechanical communication with the elapsed time assembly, the end time assembly having a second minute hand proximate the second clock face where clockwise movement of the first minute hand rotates the elapsed time dial in a second direction opposite the first direction. The clock also includes a start time digital display in mechanical communication with the start time assembly, an end time digital display in mechanical communication with the end time assembly, and a selector assembly. The selector assembly is moveable between a first configuration in which the elapsed time assembly is in mechanical communication with the start time assembly and not in mechanical communication with the end time assembly, and a second configuration in which the elapsed time assembly is in mechanical communication with the end time assembly and not in mechanical communication with the start time assembly.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
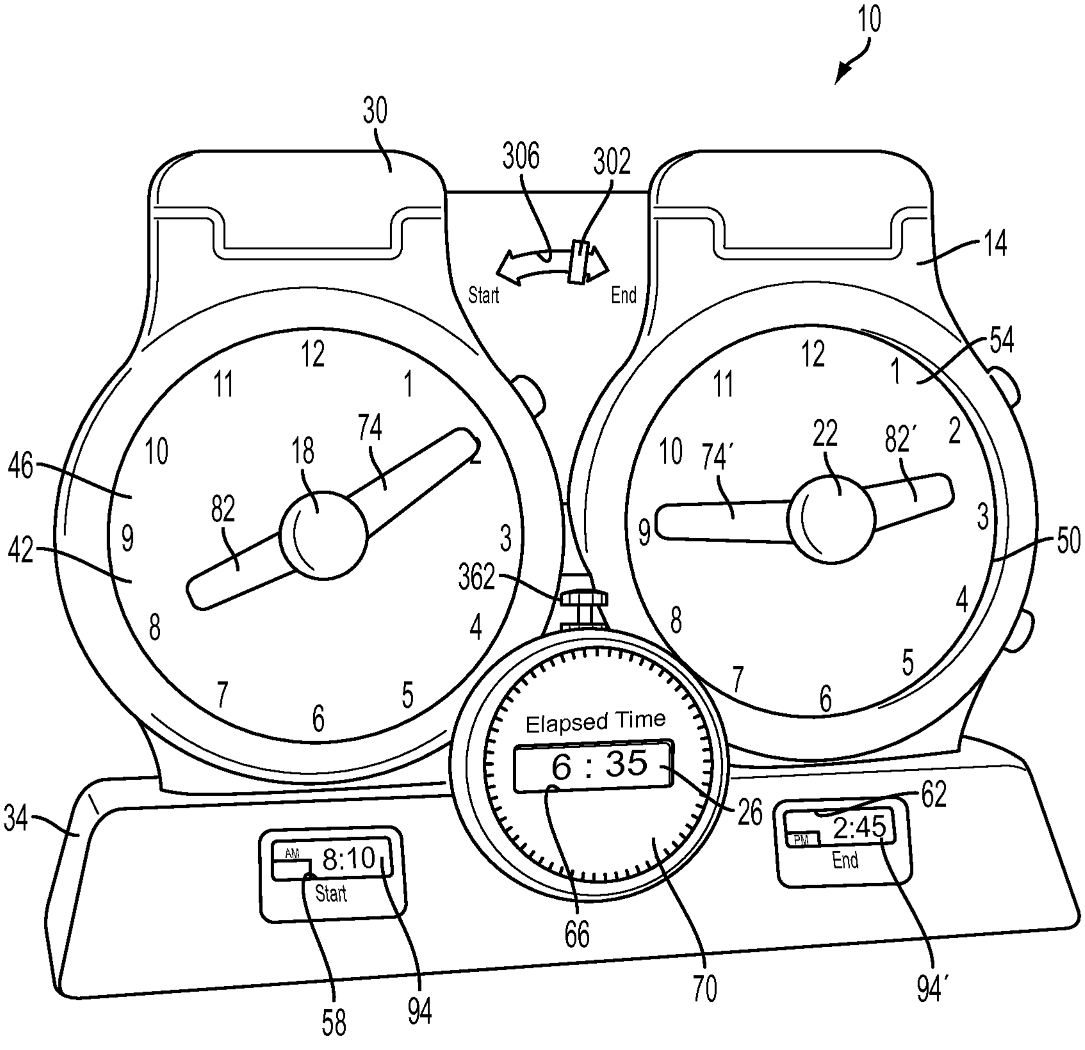
FIG. 1 illustrates an elapsed time clock.

Exemplary embodiments of the present invention provide systems and methods for providing an elapsed time clock assembly configured to manually display the elapsed time between a start time and an end time. In some exemplary embodiments, the system includes both analog and digital readouts.

FIGS. 1-18 illustrate an elapsed time clock assembly 10 to be used as a teaching aid for children learning to tell time. The clock assembly 10 provides the tools and information necessary to allow children to set a start and end time in analog form, verify that the desired start and end times were input by providing a supplemental display showing each time in digital format, and determine the difference or elapsed time between the start and end times by providing a calculated duration. In the illustrated construction, the clock assembly 10 includes a body 14, a start time assembly 18, an end time assembly 22, and an elapsed time assembly 26.

Best illustrated in FIG. 1, the body 14 of the clock assembly 10 is generally shaped to depict a pair of analog wristwatches positioned side-by-side with a stopwatch positioned therebetween. The body 14 includes a front cover 30 forming the faces of the watches and a back cover 34 coupled to the front cover 30 to define a cavity 38 therebetween. In the illustrated construction, the body 14 includes a start time clock 42 having a start time clock face 46 and an end time clock 50 having an end time clock face 54. Although not shown, the body may also include stickers, decals, or other forms of indicia to indicate the clock positions, clock functions, AM/PM, operating instructions, and the like.

The front cover 30 also includes a first aperture 58 positioned below the start time clock face 46 and aligned with the start time digital assembly 94, described below, to allow the user to view the start time in a digital format. Similarly, the front cover 30 includes a second aperture 62 positioned below the end time clock face 54 and aligned with the end time digital assembly 94', described below, to allow the user to view the end time in digital format. In some constructions, each aperture 58, 62 may include a shutter assembly, not shown, so the user can selectively expose and hide the digital readout for each corresponding clock face 46, 54.

The front cover 30 also includes a third aperture 66, positioned on the face of the stopwatch 70 and aligned with the elapsed time assembly 26. The third aperture 66 allows the user to view the elapsed time information calculated by the elapsed time assembly 26. In the illustrated construction, the third aperture 66 is selectively covered by a shutter assembly 350, described below.

Figure 2:
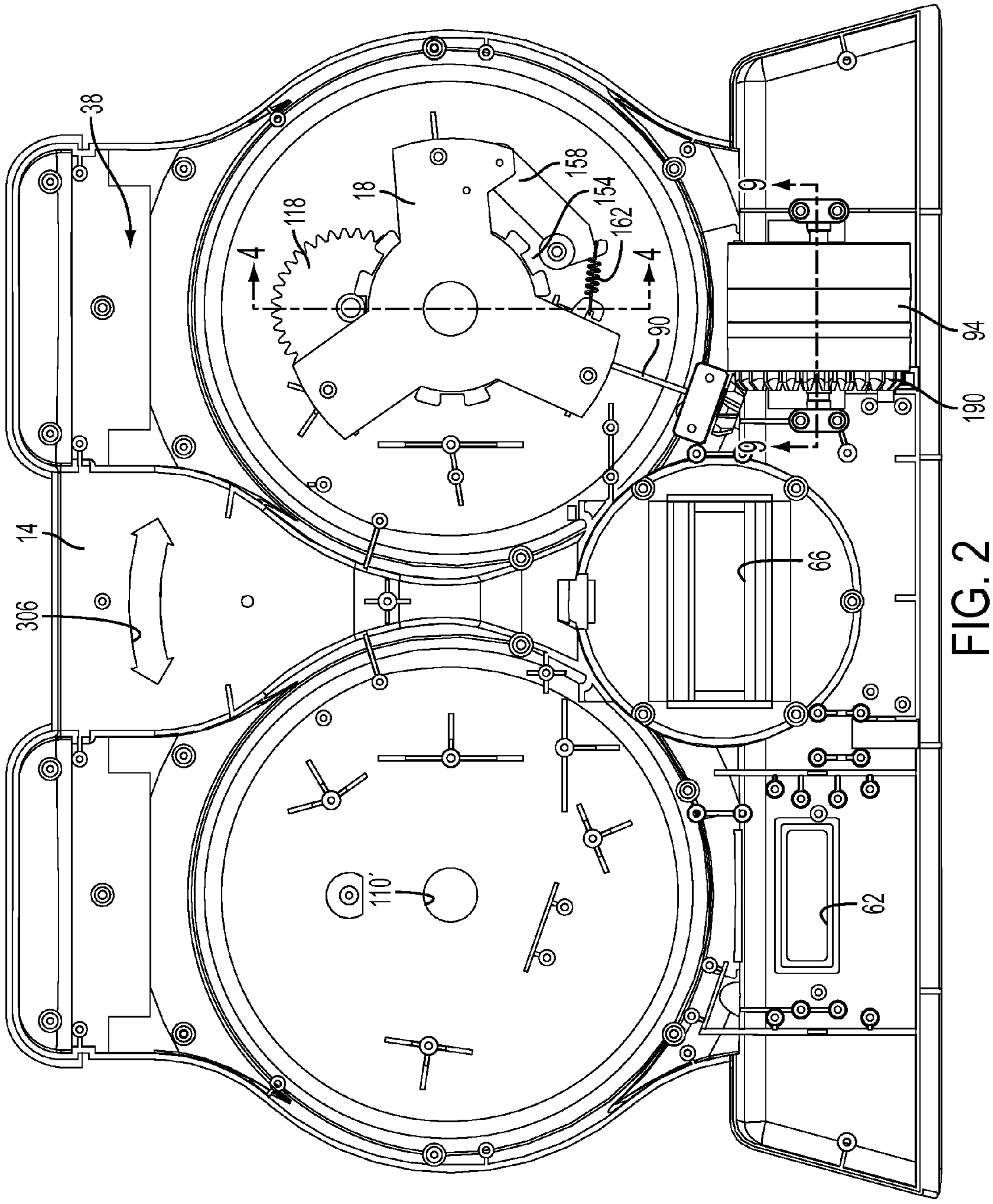
FIG. 2 is a rear view of the elapsed time clock of FIG. 1 with the rear cover, end time assembly and elapsed time assembly removed.
Figure 3:
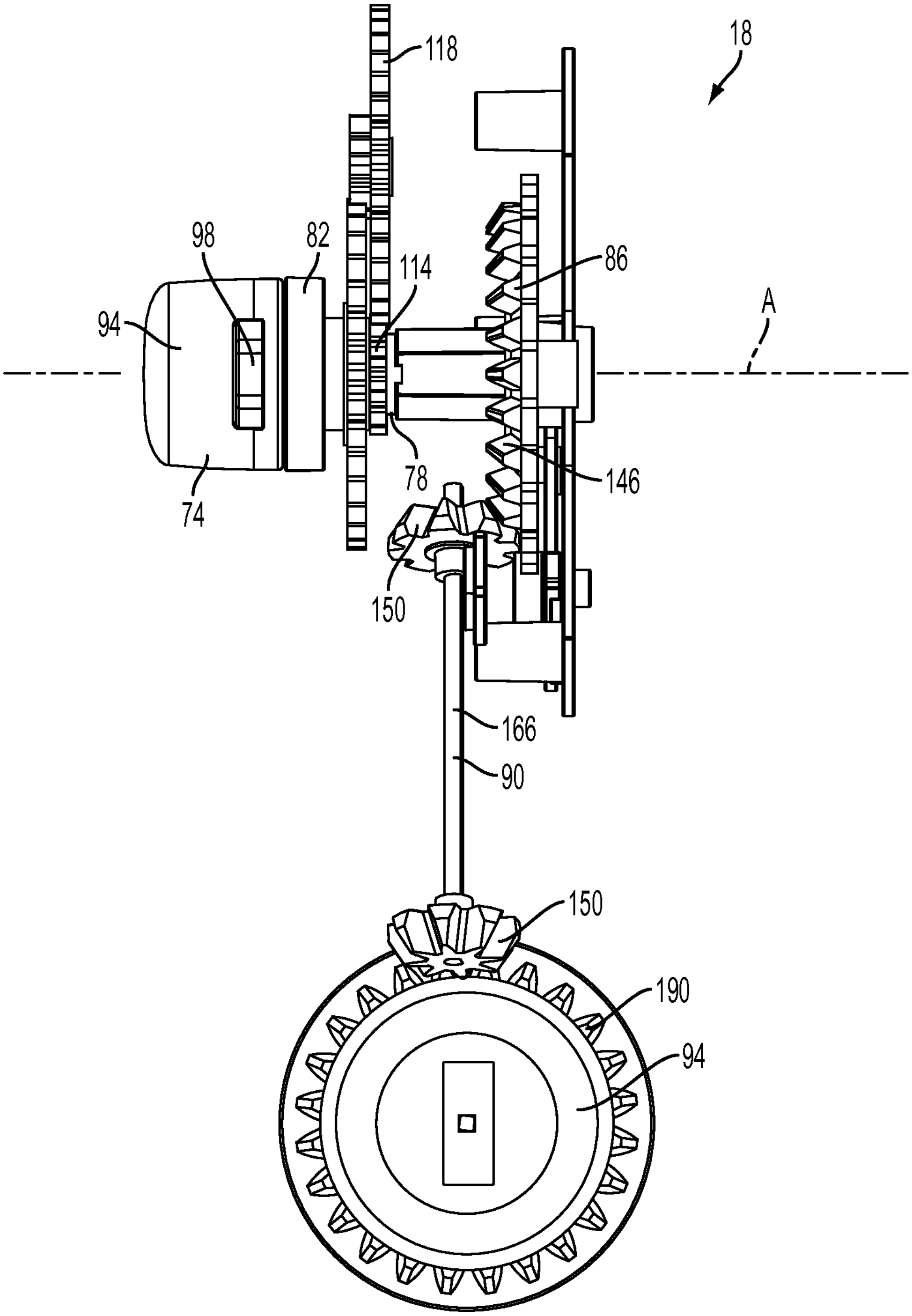
FIG. 3 is a side view of the start time assembly.
Figure 4:
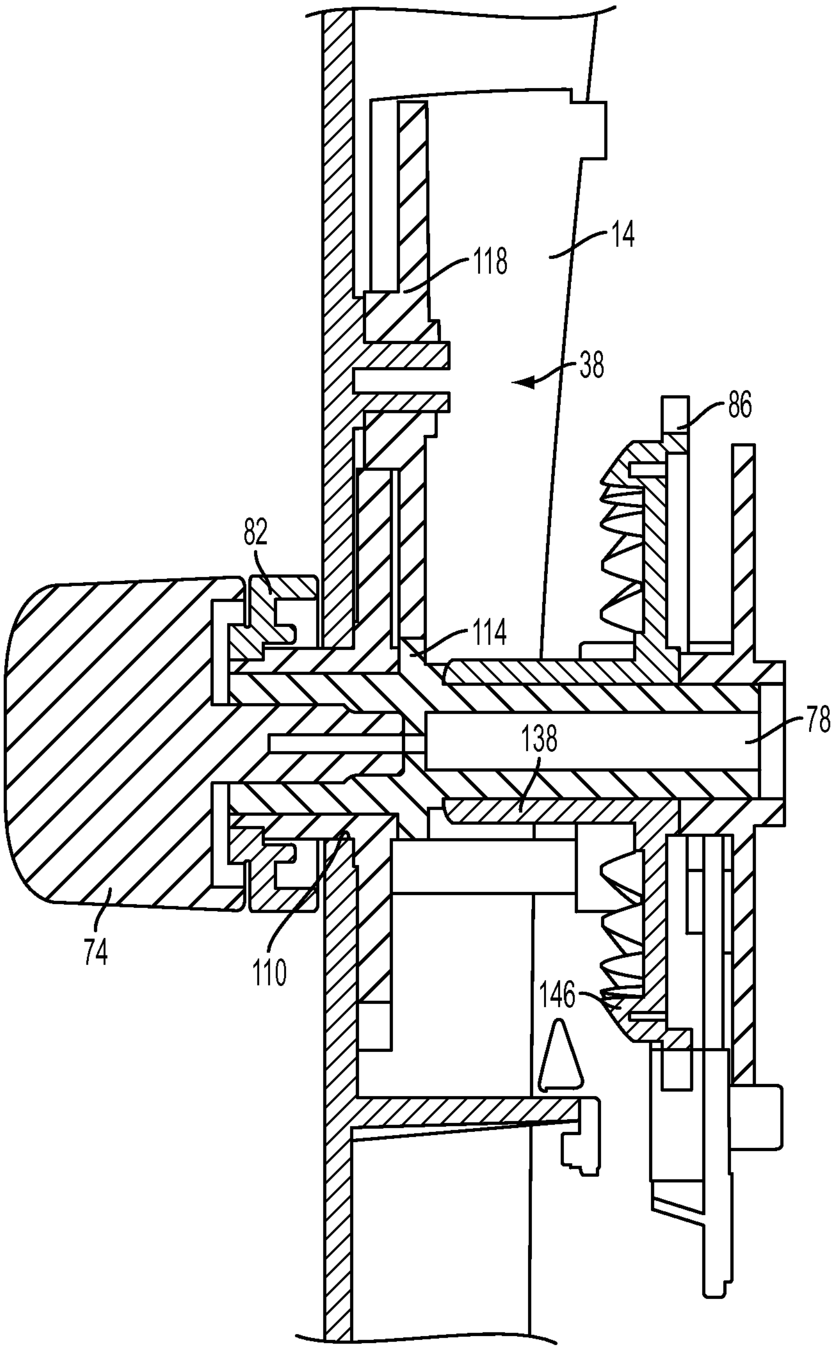
FIG. 4 is a section view taken along line 4-4 of FIG. 2.

Best illustrated in FIGS. 2-4, the start time assembly 18 is positioned within the cavity 38 and includes a minute hand 74, a minute output shaft 78 operatively coupled to the minute hand 74, an hour hand 82 driven by the minute hand 74, an indexing gear 86, a drive shaft 90, and a start time digital assembly 94. The start time assembly 18 is configured to take inputs by the user, generally in the form of rotating the minute hand 74 either clockwise or counter clockwise, and transmitting them to the start time digital assembly 94, to depict the start time in digital format, and to the elapsed time assembly 26, to at least enable the determination of the elapsed time.

Figure 5:
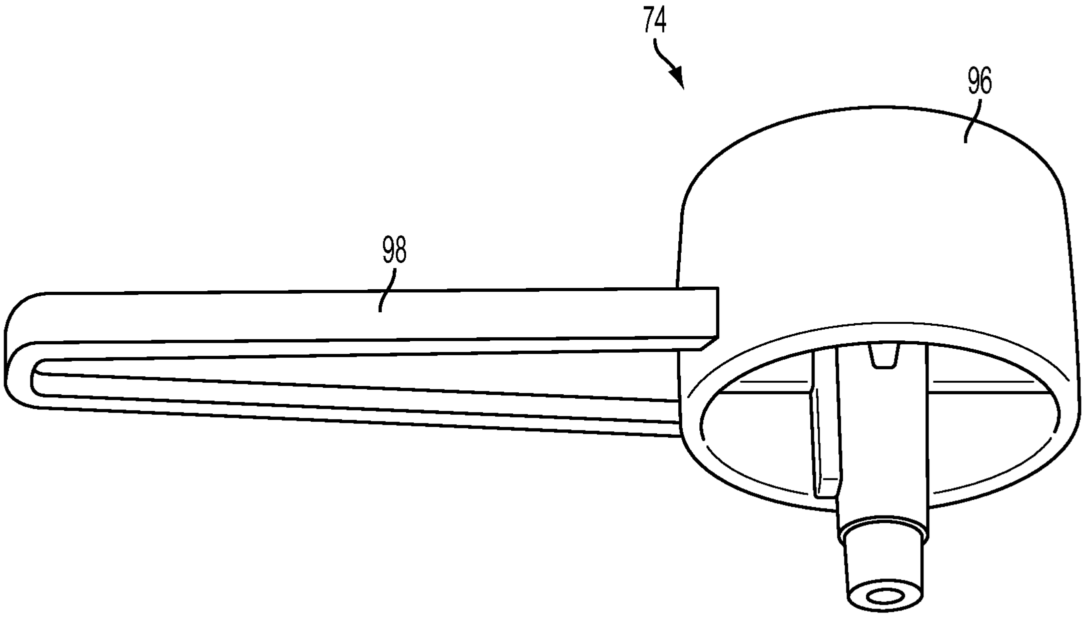
FIG. 5. is a perspective view of the minute hand of the elapsed time clock of FIG. 1.

The minute hand 74 of the start time assembly 18 includes a substantially dome shaped hub 96 and an indicator or hand 98 extending from the hub 96 to indicate the minute aspect of the start time (see FIG. 5). When assembled, the minute hand 74 is coupled to the minute output shaft 78 such that the two entities rotate synchronously as a unit about an axis A. When the clock assembly 10 is in use, the user can change the time on the start clock 42 by biasing (e.g., rotating) the minute hand 74 either clockwise or counter clockwise about the axis A until the desired time is shown.

Figure 6:
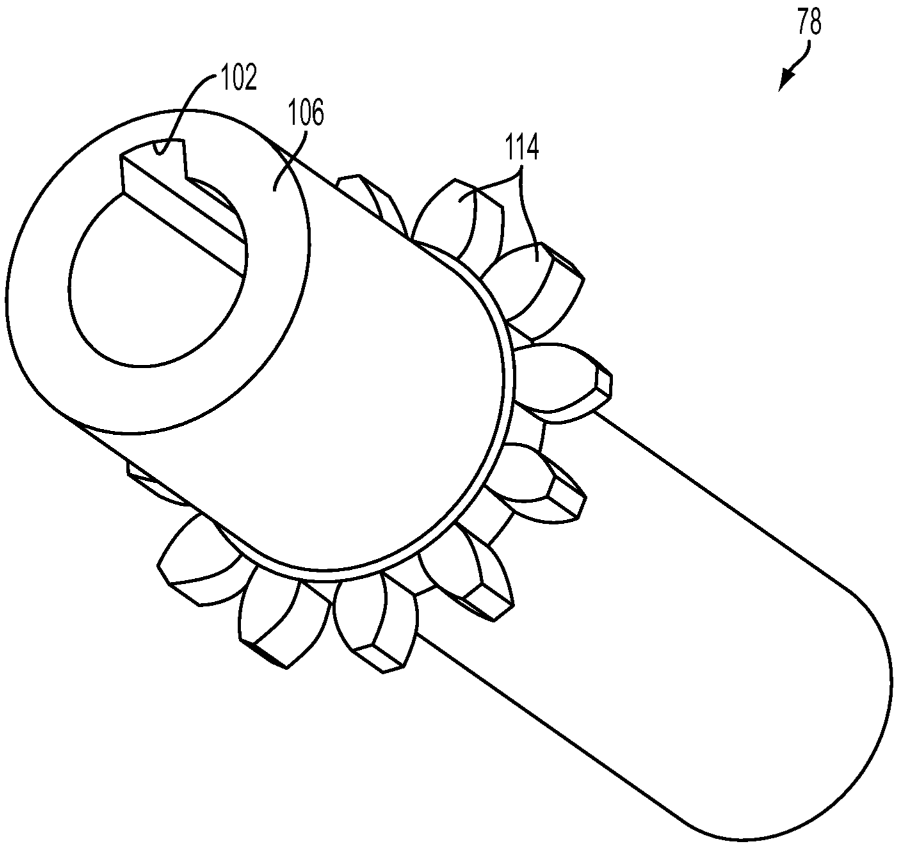
FIG. 6 is a perspective view of the minute hand output shaft of the elapsed time clock of FIG. 1.
Figure 7:
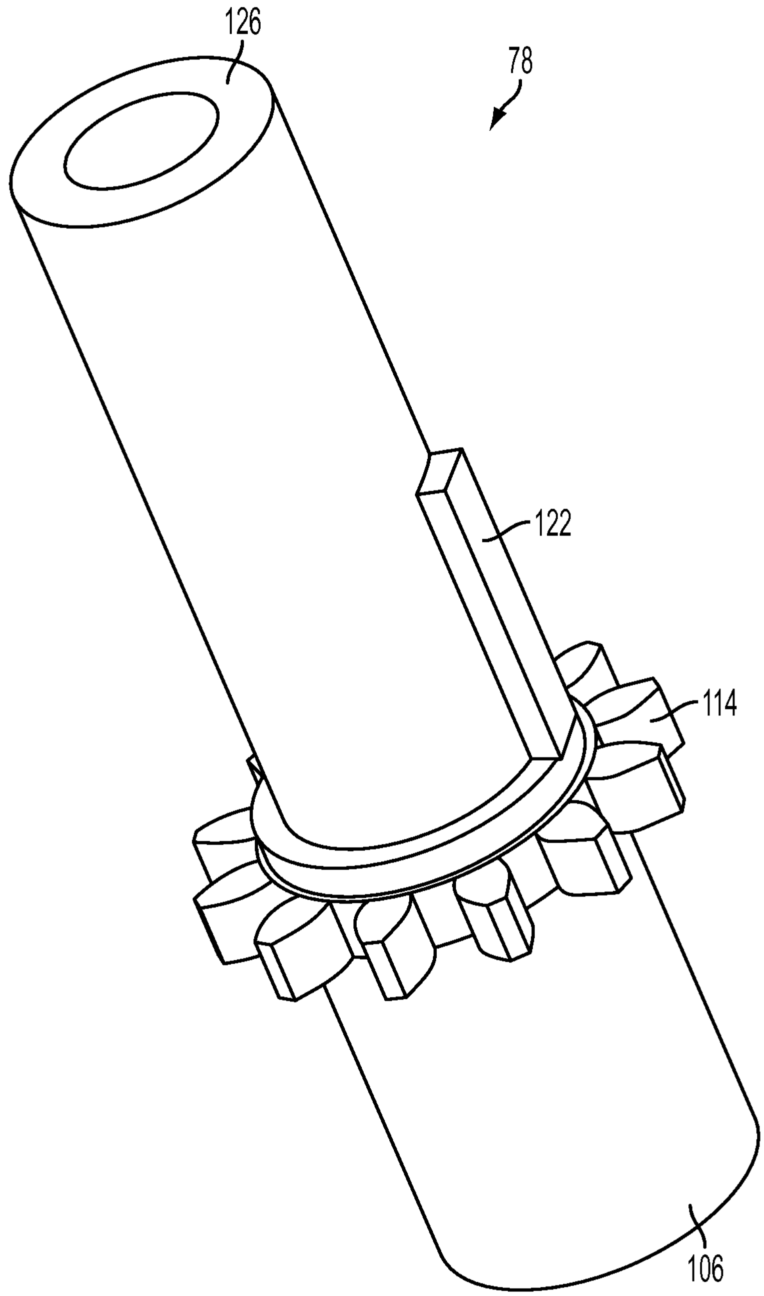
FIG. 7 is a rear perspective view of the minute hand output shaft of FIG. 6.

Illustrated in FIGS. 6 and 7, the minute output shaft 78 of the start time assembly 18 is substantially elongated in shape. The output shaft 78 defines a keyway 102 extending axially inwardly from a first end 106 to receive a portion of the minute hand 74 therein. During operation, the keyway 102 transmits torque between the minute hand 74 and the output shaft 78, causing the two entities to rotate as a unit. In the illustrated construction, the output shaft 78 is positioned within and is rotateable with respect to the hour hand 82 of the start assembly 18, which in turn extends through an aperture 110 (see FIG. 4) positioned proximate the center of the start time clock face 46. Both the output shaft 78 and the hour hand 82 are able to rotate independently about the axis A during operation.

The output shaft 78 also includes a plurality of gear teeth 114 extending radially outwardly from the shaft to mesh with additional gears to form the hour hand gear train 118. When assembled, the hour hand gear train 118 is configured to rotate the hour hand 82 of the start time assembly 18 by 30 degrees for every 360 degrees the minute hand 74 rotates (e.g., 12:1 ratio).

The output shaft 78 also includes a key 122, extending radially outwardly from the shaft and oriented parallel to the axis A. In the illustrated construction, the key 122 originates proximate the gear teeth 114 and extends axially towards a second end 126 of the output shaft 78 (see FIG. 7). When assembled, the key 122 is sized to be received within a keyway 142 formed in the indexing gear 86, causing the output shaft 78 and the indexing gear 86 to rotate as a synchronized unit.

Figure 8:
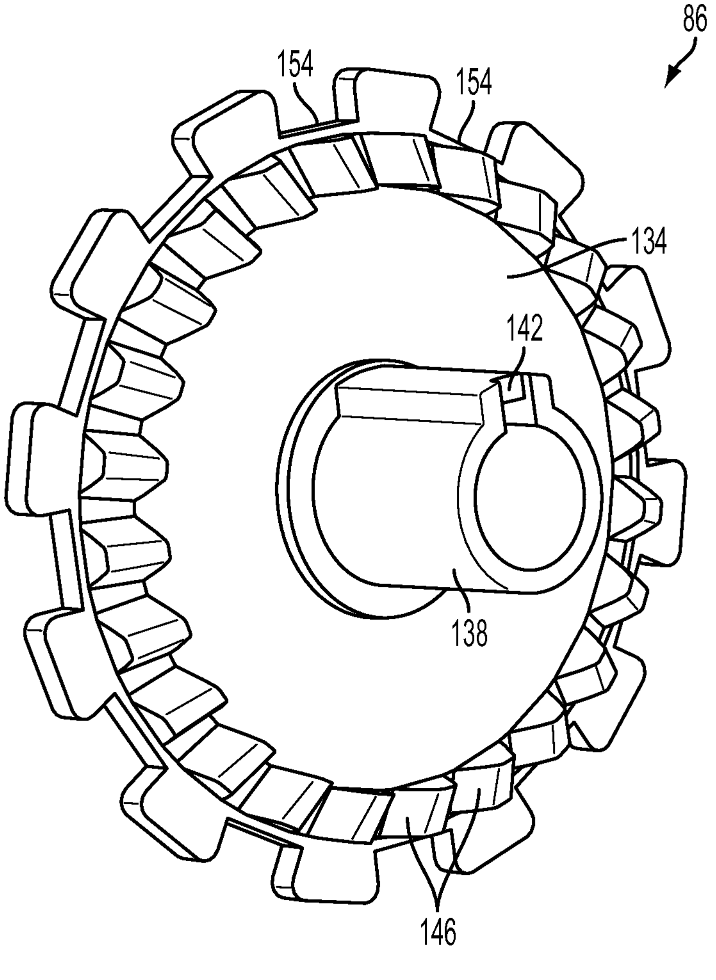
FIG. 8 is a perspective view of the indexing gear of the elapsed time clock of FIG. 1.

Best illustrated in FIG. 8, the indexing gear 86 of the start time assembly 18 is substantially disk shaped and includes a body 134, and a shaft 138 extending axially from the body 134 to define a keyway 142. When assembled, the second end 126 of the minute hand output shaft 78 is positioned within the shaft 138 such that the key 122 is received within the keyway 142. The output shaft 78 and the indexing gear 86 can then rotate as a unit about the axis A.

The indexing gear 86 also includes a set of gear teeth 146 positioned proximate and extending along the periphery of the body 134. When assembled, the gear teeth 146 are configured to mesh with a sprocket 150 of the drive shaft 90 (see FIG. 3). In the illustrated construction, the gear teeth 146 are coarse, and include tapered surfaces allowing the drive shaft 90 to be positioned at an angle with respect to the indexing gear 86 (e.g., radial with respect to axis A).

The indexing gear 86 also includes a plurality (e.g., 12) notches 154 spaced equally along the periphery of the gear. Each notch 154 extends radially inwardly from the periphery and is sized to correspond with a detent 158 (see FIGS. 2 and 14) biased into engagement with the indexing gear 86 by a biasing member or spring 162. Each time the user rotates the minute hand 74 approximately 30 degrees, the detent 158 will enter an adjacent notch 154 of the indexing gear 86, causing the user to feel or hear a "click." When the indexing gear 86 used in conjunction with the clock face 46, the spacing of the each notch 154 is positioned to substantially correspond with the 5 minute marks on the clock face 46. The minute hand 74 is indexed in five minute intervals (e.g., 5, 10, 15, and 20 minutes past the hour). In alternate constructions, the number of notches 154 formed in the indexing gear 86 may be altered to change the interval at which the minute hand 74 can be indexed; for example, in some constructions the indexing gear 86 may include 60 notches so that the minute hand 74 can be indexed every minute; in still other constructions, the indexing gear 86 may include four notches so the minute hand 74 is indexable every 15 minutes (e.g., 0, 15, 30, and 45 minutes past the hour).

As shown in FIG. 3, the start time assembly 18 also includes a drive shaft 90, operatively coupled to the indexing gear 86 and to the start time digital assembly 94 to transmit torque therebetween. In the illustrated construction, the drive shaft 90 is rotateably mounted to the body 14 and includes a cylindrical shaft 166 with a sprocket 150 positioned on either end.

Figure 9:
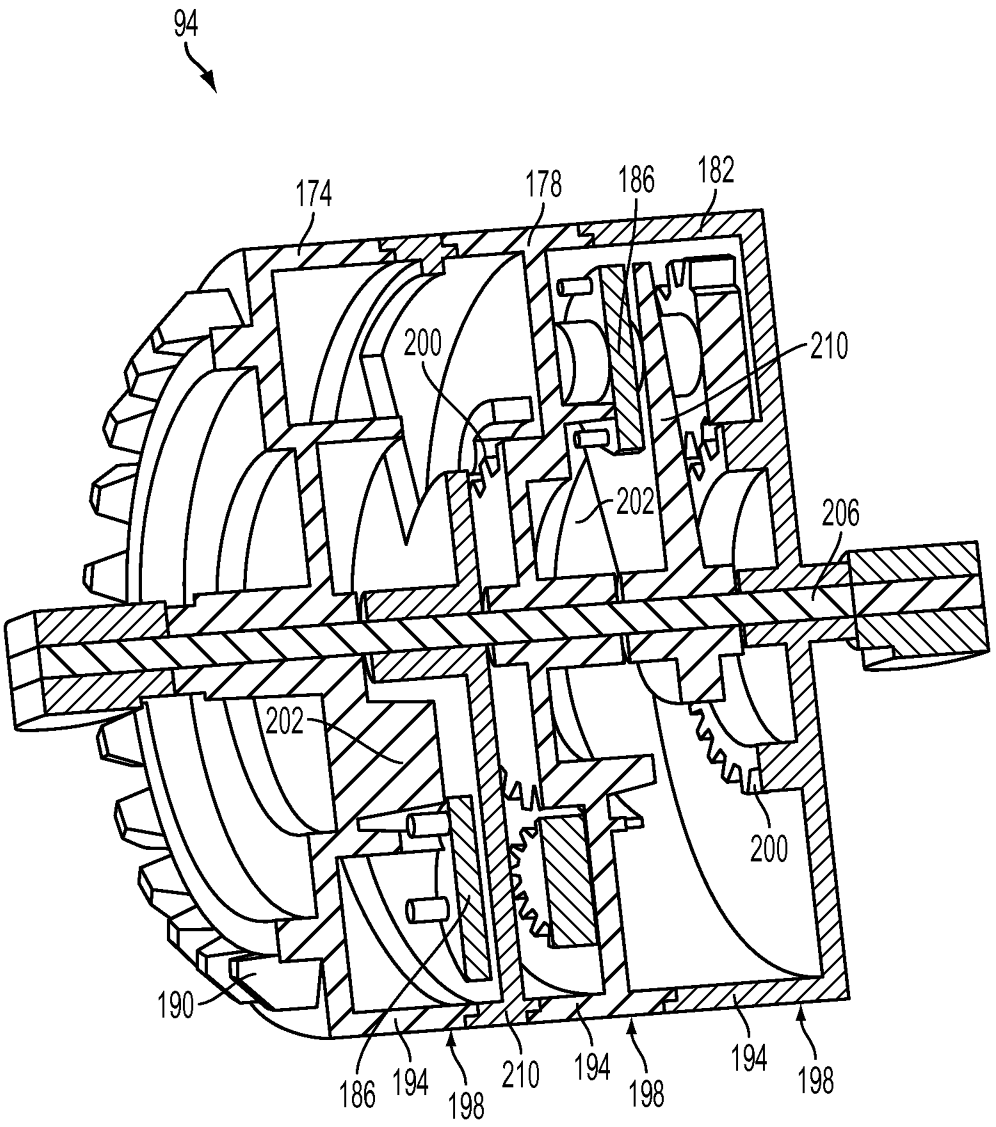
FIG. 9 is a section view taken along line 9-9 of FIG. 2.

Best illustrated in FIG. 9, the start time digital assembly 94 includes a plurality (e.g., 3) of dials, each of which rotate at various rates in response to input torque from the drive shaft 90. The digital assembly 94 is configured to display the time represented on the start time clock face 46 in a digital format by rotating the appropriate indicia into alignment with the first aperture 58. The digital assembly 94 includes a minute dial 174 in operable communication with the drive shaft 90, an hour dial 178 driven by the minute dial 174, and a meridiem dial 182 driven by the hour dial 178. In the illustrated construction, the start time digital assembly 94 works much like a mechanical odometer, having internally positioned helper gears 186, each configured to advance a dial of the assembly 94 a given amount when the preceding dial rotates past an index point. During operation, the minute dial 174, is rotated by the drive shaft 90 by way of a set of gear teeth 190 formed proximate the periphery of the dial.

Illustrated in FIG. 9, each dial 174, 178, 182 of the digital assembly 94 is substantially cylindrical in shape, having an annular wall 194 that defines an outer surface 198. The minute and hour dials 174, 178 also include an interior cog 202 to engage the helper gear 186 in mechanical communication with the subsequent dial once per rotation. Furthermore, the hour and meridiem dials 178, 182 include a set of interior gear teeth 200 to mesh with the helper gear 186 in mechanical communication with the preceding dial. In the illustrated construction, each of the dials 174, 178, 182 are rotateably mounted to a common shaft 206.

The minute dial 174 includes indicia corresponding to the minute aspect of the start time. The minute dial 174 includes indicia showing the digital time in five minute intervals (e.g., :00, :05, :10, :15 . . . :55) each integer spaced 30 degrees from one another along the outer surface 198 of the dial. Each time the minute dial 174 is rotated 30 degrees in either direction, a new minute reading is visible through the first aperture 58 of the body 14. More specifically, when the minute dial 174 is rotated 30 degrees in a first direction, the next integer on the outer surface 198 is visible through the first aperture 58 (e.g., from :00 to :05, from :25 to :30, and from :55 to :00) and when the minute dial 174 is rotated 30 degrees in a second direction, opposite the first direction, the previous integer on the outer surface 198 is visible through the first aperture 58 (e.g., from :05 to :00, from :30 to :25, and from :00 to :55).

The hour dial 178 includes indicia corresponding to the hour aspect of the start time. The hour dial 178 includes indicia counting by ones (e.g., 1, 2, 3, 4 . . . 12) each integer spaced 30 degrees from one another along the outer surface 198 of the dial. Each time the minute dial 174 rotates between showing the :55 minute mark and the :00 minute mark (e.g., the indexing point), the hour dial 178 is advanced 30 degrees. More specifically, when the minute dial 174 rotates clockwise from showing the :55 minute mark to the :00 minute mark, the hour dial 178 rotates 30 degrees in a first direction, causing the next integer on the dial to become visible through the first aperture 58 (e.g., from 1 to 2, from 6 to 7, and from 12 to 1). Similarly, when the minute dial 174 rotates counter-clockwise from showing the :00 minute mark to showing the :55 minute mark, the hour dial 178 rotates 30 degrees in a second direction, opposite the first direction, causing the dial to display the previous integer on the dial through the first aperture 58 (e.g., from 2 to 1, from 7 to 6, and from 1 to 12). For example, if "12:55" is visible in the first aperture 58 of the body 14 and the minute dial 174 is rotated 30 degrees in the first direction, the minute dial 174 will rotate to display :00, causing the hour dial 178 to rotate in the first direction 30 degrees and display a 1. The resulting display will then be "1:00." A similar process also holds true if the minute dial 174 is rotated in a second direction opposite the first, in which case the process will reverse itself and the display will return to "12:55." It is important to note that the hour dial 178 will only rotate as the minute dial 174 rotates between showing :55 and :00 (e.g., the indexing point); any other rotation of the minute dial 174 will leave the hour dial 178 unchanged.

The meridiem dial 182 includes indicia corresponding to which portion of the day the clock is in (e.g., AM or PM). More specifically, the meridiem dial 182 includes indicia alternating between AM and PM every 30 degrees along the outer surface 198 of the dial. Each time the hour dial 178 changes between 12 and 11 (e.g., the indexing point), the meridiem dial 182 rotates 30 degrees to change from one of AM or PM, to the other of AM or PM. For example, if "AM 11:55" is displayed through the first aperture 58 of the body 14 and the minute dial 174 is rotated 30 degrees in a first direction, the minute dial will rotate to display :00 while causing the hour dial 178 to rotate in the first direction 30 degrees to display a 12. The rotation of the hour dial 178 causes the meridiem dial 182 to rotate by 30 degrees in the first direction to display a PM. The resulting display will then be "PM 12:00." The same process holds true if the minute dial 174 is rotated 30 degrees in the second direction, in which case the process will reverse itself, causing the display to return to "AM 11:55." Similar to the hour dial 178, the meridiem dial 182 will only rotate when the hour dial 178 is changing between 12 and 11 (e.g., the indexing point), and all other rotation of the hour dial 178 will leave the meridiem dial 182 unchanged.

The digital assembly 94 also includes a plurality of stationary plates 210, each positioned between adjacent dials to provide a mounting location for the helper gear 186. The stationary plates 210 are also configured to support and align the adjacent dials with one another during use. In the illustrated construction, each plate 210 is supported by the shaft 206 extending through the digital assembly 94.

To set the desired start time in the elapsed time assembly 10, the user biases (e.g., rotates) the minute hand 74 either clockwise or counter-clockwise with respect to the start time clock face 46. As the minute hand 74 rotates, the torque created by the user will be transmitted from the minute hand 74 and into the minute hand output shaft 78. The output shaft 78 in turn advances the hour hand 82 (e.g., by way of the hour hand gear train 118) and the indexing gear 86 (e.g., by way of the key 122).

As the user continues to advance the minute hand 74, the user will feel or hear the minute hand "click" at each 5 minute mark (e.g., every 30 degrees) along the clock face 46 in response to the detent 158 entering one of the equally spaced notches 154 of the indexing gear 86. The hour hand 82 will automatically advance as necessary.

In addition to advancing the hour hand 82 and indexing gear 86, the torque from the user will also be transmitted to the minute dial 174 of the start time digital assembly 94 by way of the drive shaft 90. The minute dial 174 of the digital assembly 94 is configured such that the indicia will be centrally aligned with the first aperture 58 each time the detent 158 is positioned within a notch 154 of the indexing gear 86.

For example, if the minute and hour hands 74, 82 are positioned in the 11:55 position on the clock face 46 and the first aperture 58 displays "AM 11:55," the torque provided by the user as the user indexes the minute hand 74 clockwise, rotates the minute hand 74 forward 30 degrees, until the detent 158 enters the adjacent notch 154 in the indexing gear 86 and the user feels or hears a "click." During this movement, the hour hand 82 is moved clockwise 2.5 degrees by way of the hour hand gear train 118, causing the analog clock face to display 12:00. At the same time, the torque is also transmitted by way of the drive shaft 90, into the minute dial 174 of the digital assembly 94, causing the minute dial 174 to rotate in the first direction 30 degrees. As describe above, this rotation will result in the digital display changing from "AM 11:55" to "PM 12:00," mirroring the change of the analog clock face. If the user decides to return the minute hand 74 back to its original position, all the processes will return to their initial positions, causing the analog clock face 46 to display 11:55 and the first aperture 58 to display "AM 11:55."

Figure 10:
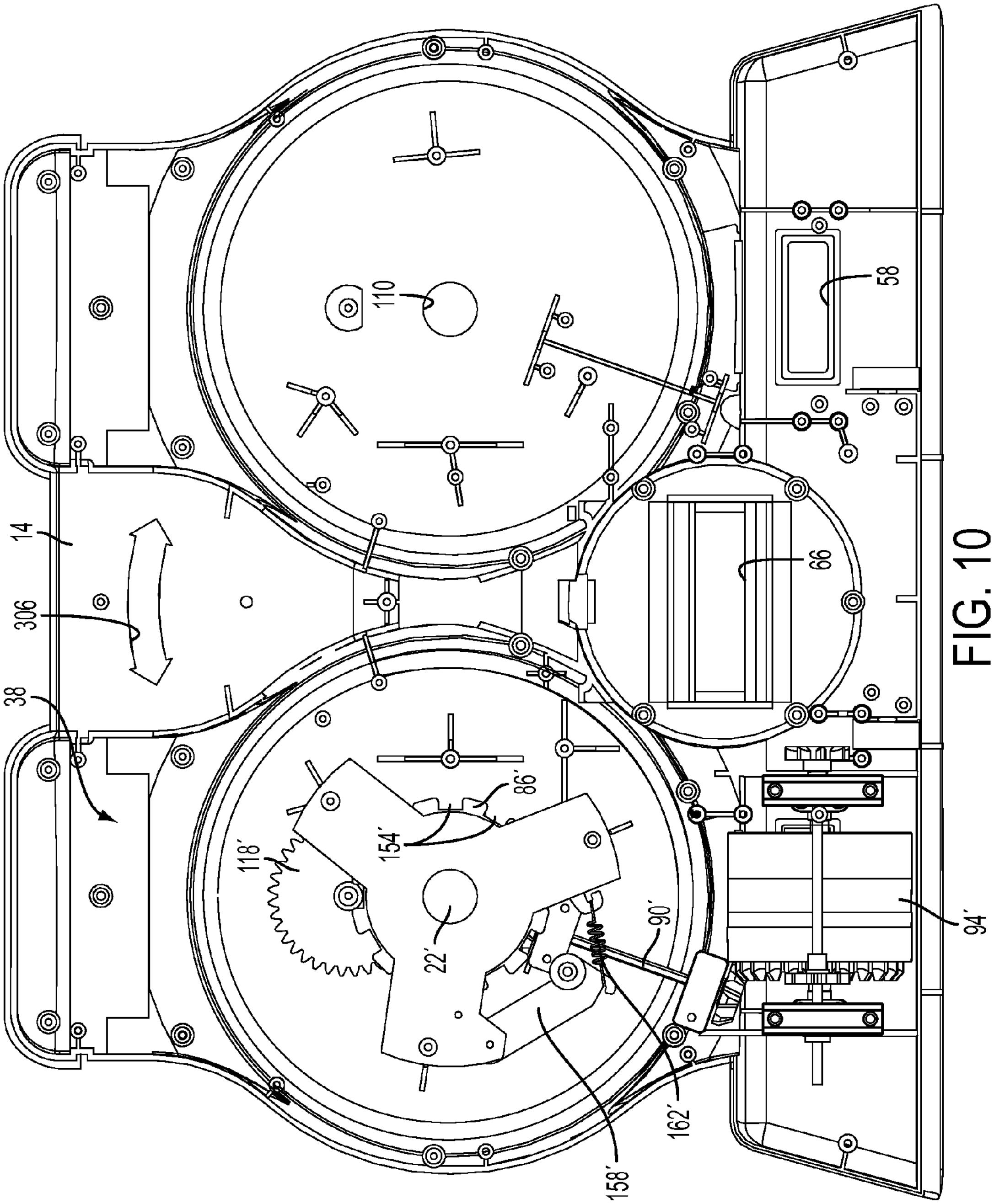
FIG. 10 is a rear view of the elapsed time clock of FIG. 1 with the rear cover, start time assembly and the elapsed time assembly removed.

As best shown in FIG. 10, the end time assembly 22 employs much of the same structure and has many of the same properties as the previously-described start time assembly 18. Analogous elements to those of the start time assembly 18 have been given the same number and a prime symbol. The following description of the end time assembly 22 focuses primarily upon structure and features different than the previously-described start time assembly 18.

The end time assembly 22 is configured to take inputs by the user, generally in the form of rotating the minute hand 74' either clockwise or counter clockwise, and transmitting them to the end time digital assembly 94', to depict the end time in digital format, and to the elapsed time assembly 26, to at least enable the determination of the elapsed time. In the illustrated construction, the minute hand 74' and the hour hand 82' of the end time assembly 22 are positioned proximate the center of the end time clock face 54. Furthermore, the end time digital assembly 94' is substantially aligned with the second aperture 62 of the body 14.

Figure 11:
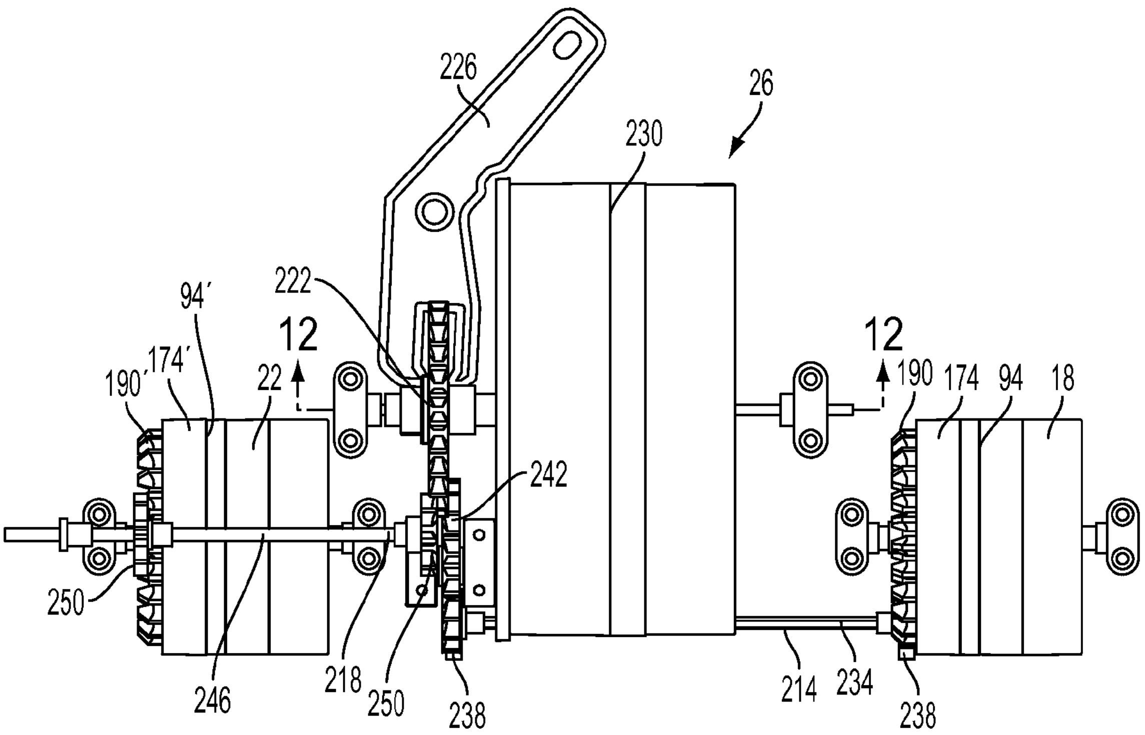
FIG. 11 is a rear view of the elapsed time assembly of the elapsed time clock of FIG. 1.
Figure 12:
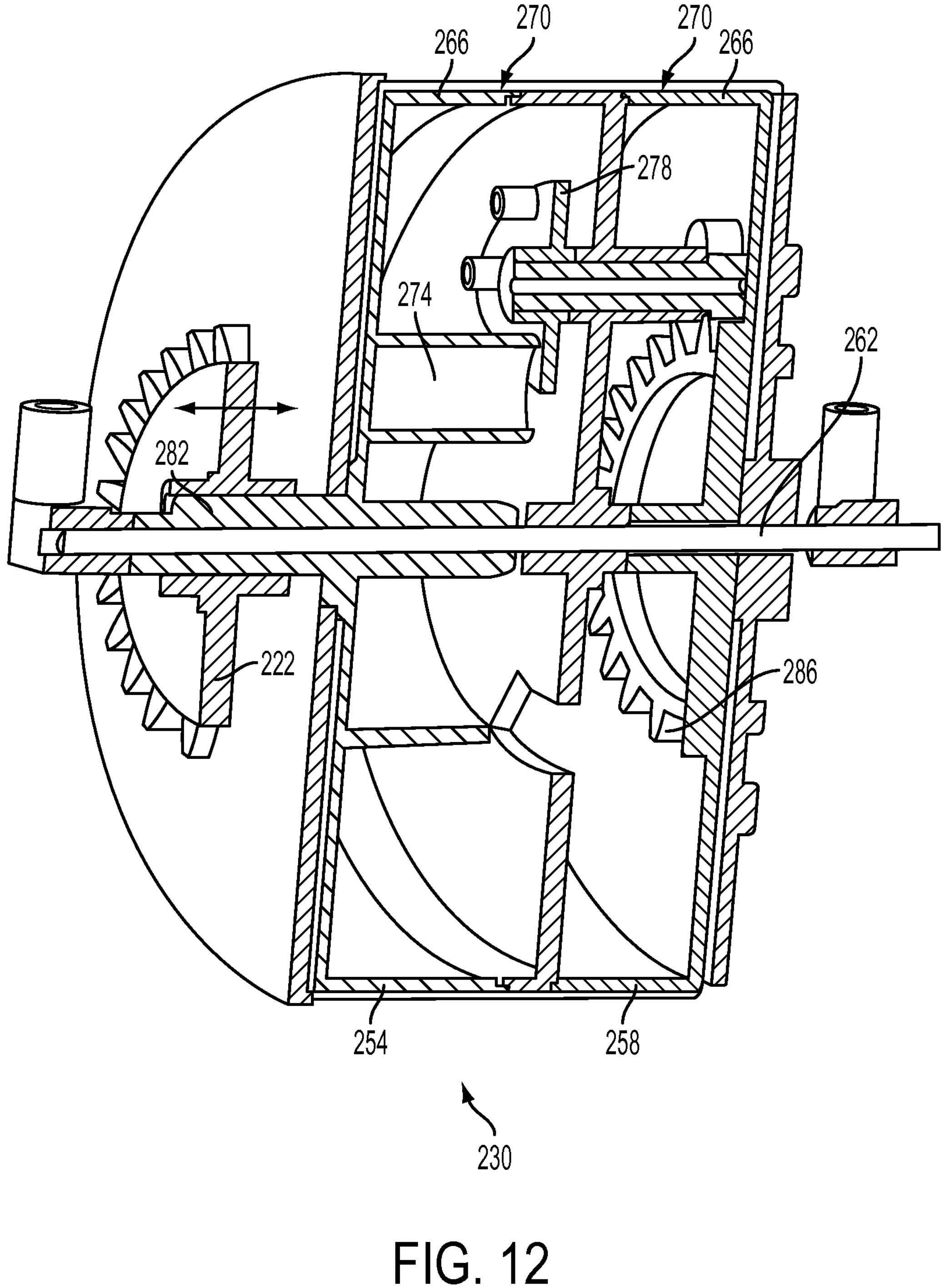
FIG. 12 is a section view taken along line 12-12 of FIG. 11.

Illustrated in FIGS. 11 and 12, the elapsed time assembly 26 is positioned within the cavity 38 of the body 14 and is configured to receive inputs, generally in the form of rotation and torque, from both the start time assembly 18 and the end time assembly 22. The elapsed time assembly 26 displays the amount of elapsed time (e.g., the difference) between the start time and the end time in digital format. The elapsed time assembly 26 includes a start time input shaft 214, an end time input shaft 218, an input gear 222 controlled by a selection assembly 226, and an elapsed time digital assembly 230.

Best illustrated in FIG. 11, the start time input shaft 214 extends between the start assembly 18 and the elapsed time assembly 26 to transmit torque therebetween. The start time input shaft 214 includes an elongated shaft 234 with a sprocket 238 positioned on each end. When assembled, one sprocket 238 meshes with the gear teeth 190 of the minute dial 174 of the start time assembly 18, while the other sprocket 238 is meshable with the input gear 222 by way of an intermediate gear 242 positioned therebetween.

As shown in FIG. 11, the end time input shaft 218 extends between the end time assembly 22 and the elapsed time assembly 26 to transmit torque therebetween. The end time input shaft 218 includes an elongated shaft 246 with a sprocket 250 positioned on each end. When assembled, one sprocket 250 meshes with the gear teeth 190' of the minute dial 174' of the end time assembly 22, while the other sprocket 250 is meshable with the input gear 222.

Best illustrated in FIG. 12, the elapsed time digital assembly 230 is positioned within the cavity 38 of the body 14 and is configured to display the amount of time between the start time and the end time in digital format. The elapsed time digital assembly 230 is substantially similar to the start time digital assembly 94 in that the elapsed time digital assembly 230 also includes a plurality (e.g., two) of dials, each of which are configured to rotate at various rates in response to input torque from either the start time assembly 18 or the end time assembly 22. In the illustrated construction, the elapsed time digital assembly 230 includes a minute dial 254 coupled to and rotatable by the input gear 222, and an hour dial 258 driven by the minute dial 254. In the illustrated construction, both the minute dial 254 and the hour dial 258 are rotateably mounted to a common rod 262.

Illustrated in FIG. 12, each dial 254, 258 of the elapsed time digital assembly 230 is substantially cylindrical in shape, having an annular wall 266 that defines an outer surface 270. The minute dial 254 includes an interior cog 274 configured to engage the helper gear 278, which is in mechanical communication with the hour dial 258, once per rotation. Furthermore, the minute dial 254 includes a protrusion 282, extending axially outwardly from the dial 254 and substantially encompassing a portion of the rod 262. In the illustrated construction, the key protrusion 282 is sized such that the input gear 222 is slideable axially along the protrusion 282, while able to transmit torque therewith.

The hour dial 258 includes a set of interior gear teeth 286 configured to mesh with the helper gear 278 of the minute dial 254.

Similar to the start time digital assembly 94, the minute dial 254 of the elapsed time digital assembly 230 includes indicia corresponding to the minute aspect of the elapsed time. The minute dial 254 includes indicia showing the digital time in five minute intervals (e.g., :00, :05, :10, :15 . . . :55), each integer spaced 30 degrees from one another along the outer surface 270 of the dial. Each time the minute dial 254 is rotated 30 degrees, a new minute reading is aligned with the third aperture 66 of the body 14. More specifically, when the minute dial 254 is rotated 30 degrees in a first direction, the next integer on the outer surface 270 is aligned with the third aperture 66 (e.g., from :00 to :05, from :25 to :30, and from :55 to :00), and when the minute dial 254 is rotated 30 degrees in a second direction, opposite the first direction, the previous integer on the outer surface 270 is aligned with the third aperture 66 (e.g., from :05 to :00, from :30 to :25, and from :00 to :55).

Also similar to the start time digital assembly 94, the hour dial 258 includes indicia corresponding to the hour aspect of the elapsed time. The hour dial 258 includes indicia counting by ones (e.g., 0, 1, 2, 3 . . . 23), each integer spaced 15 degrees from one another along the outer surface 270 of the dial. Each time the minute dial 254 rotates between showing the :55 minute mark and the :00 minute mark (e.g., the indexing point), the hour dial 258 is advanced 15 degrees. More specifically, when the minute dial 254 rotates from showing :55 to :00, the hour dial 258 rotates 15 degrees in a first direction causing the next integer on the dial to become aligned with the third aperture 66 (e.g., from 0 to 1, from 12 to 13, and from 23 to 0). Similarly, when the minute dial 254 rotates from showing :00 to showing :55, the hour dial 258 rotates 15 degrees in a second direction, opposite the first direction, causing the previous integer on the dial to align with the third aperture 66 (e.g., from 1 to 0, from 13 to 12, and from 0 to 23). For example, if "0:55" is visible in the third aperture 66 of the body 14 and the minute dial 254 is rotated 30 degrees in the first direction, the minute dial 254 will rotate to display :00, causing the hour dial 258 to rotate in the first direction 15 degrees and display a 1. The resulting display will then be "1:00." The same process also holds true if the minute dial 254 is rotated in a second direction opposite the first, in which case the process will reverse itself and the display will return to "0:55." It is important to note that the hour dial 258 will only rotate as the minute dial 254 rotates between showing :55 and :00 (e.g., the indexing point); any other rotation of the minute dial 254 will leave the hour dial 258 unchanged.

Best illustrated in FIGS. 11-14, the input gear 222 of the elapsed time assembly 26 is slideably mounted on the protrusion 282 of the minute dial 254, causing the input gear 222 and the minute dial 254 to rotate as a unit. During operation, the input gear 222 is adjustable axially along the protrusion 282 between a first position, in which the input gear 222 is meshed with the intermediate gear 254 of the start time input shaft 214, and a second position, in which the input gear 222 is meshed with the sprocket 250 of the end time input shaft 218. When assembled, the input gear 222 is moveable by the selection assembly 226 and is configured to selectively transmit torque between the start time assembly 18 and the minute dial 254 (e.g., when in the first position), or between the end time assembly 22 and the minute dial 254 (e.g., when in the second position). More specifically, when the input gear 222 is in the first position, every time the minute hand 74 of the start time assembly 18 is rotated clockwise 30 degrees (e.g., advanced one index), the minute dial 254 of the elapsed time assembly 26 is rotated in the second direction 30 degrees. Similarly, when the input gear 222 is in the second position, every time the minute hand 74' of the end time assembly 22 is rotated clockwise 30 degrees (e.g., advanced one index) the minute dial 254 of the elapsed time assembly 26 is rotated in the first direction 30 degrees. The discrepancy in rotation direction is brought about by the additional intermediate gear 254 which is present between the start time input shaft 214 and the input gear 222 but absent between the end time input shaft 218 and the input gear 222.

Figure 13:
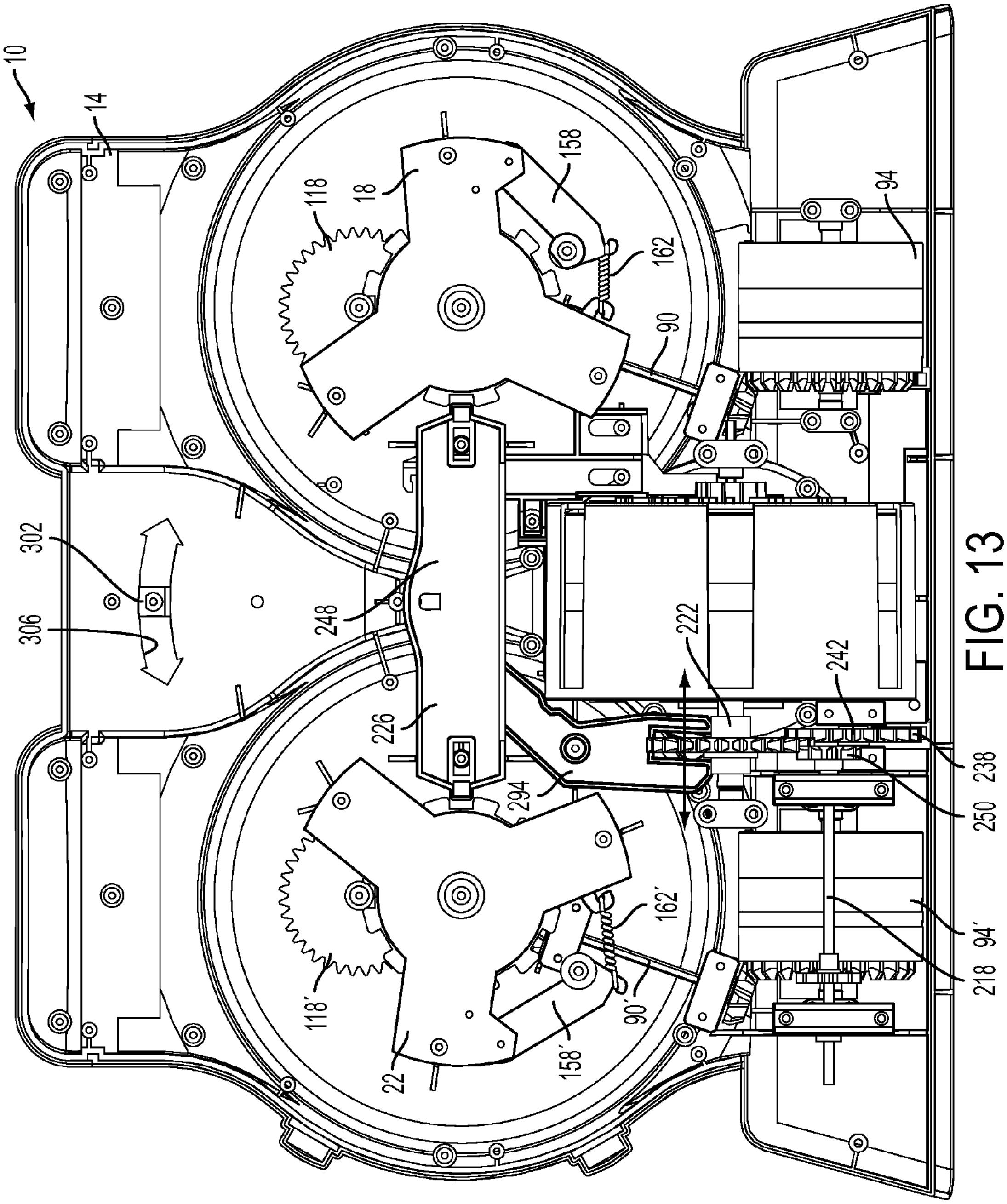
FIG. 13 is a rear view of the elapsed time clock of FIG. 1 with the rear cover removed.
Figure 14:
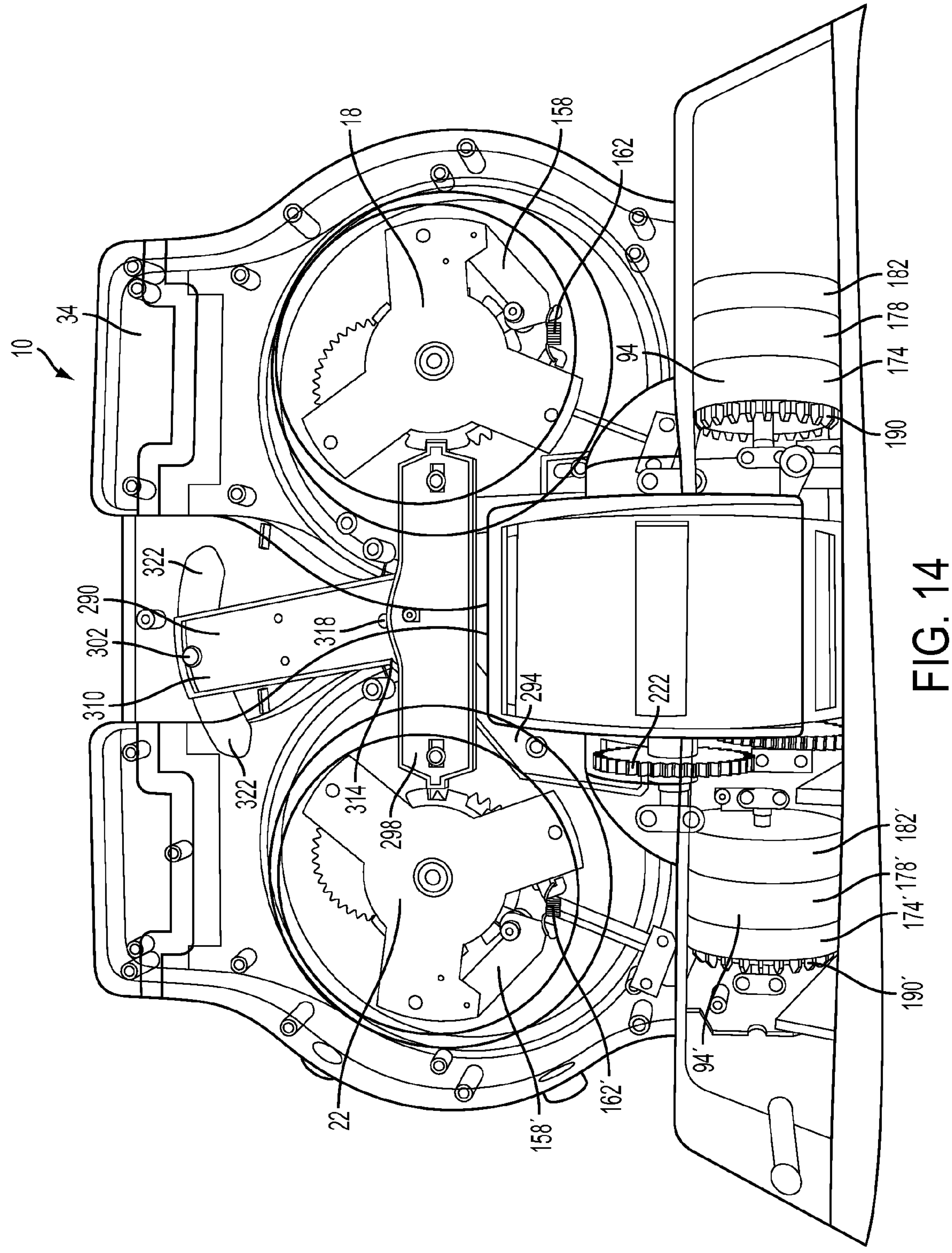
FIG. 14 is a rear view of the elapsed time clock of FIG. 1 with a transparent rear cover.

Illustrated in FIG. 13-14, the selector assembly 226 includes an input arm 290, a fork arm 294 pivotably coupled to the body 14 and driven by the input arm 290, and a locking bar 298 slideably coupled to the body 14 and driven by the input arm 290. Once assembled, the selector assembly 226 is adjustable between a start time configuration, in which the input gear 222 is biased into the first position and the end time assembly 22 is locked (e.g., the user cannot rotate the minute hand 74' with respect to the clock face 54), and an end time configuration, in which the input gear 222 is biased into the second position and the start time assembly 18 is locked (e.g., the user cannot rotate the minute hand 74 with respect to the clock face 46). During use, the user adjusts the selector assembly 226 by moving a knob 302 along a slot 306 formed in the body 14 (see FIG. 1). More specifically, when the user biases the knob 302 towards the end of the slot 306 positioned closest to the start time clock 42, the selector assembly 226 enters the start time configuration, and when the user biases the knob 302 towards the end of the slot 306 positioned closest to the end time clock 50, the selector assembly 226 enters the end time configuration.

Illustrated in FIG. 14, the input arm 290 is substantially elongated in shape, having a first end 310 coupled to the knob 302, and a second end 314 opposite the first end 310 with respect to the pivot point 318 configured to engage both the fork arm 294 and the locking bar 298. In the illustrated construction, the input arm 290 also includes a pair of wings 322 extending from the sides of the first end 310 to cover the potentially exposed portions of the slot 306.

Figure 15:
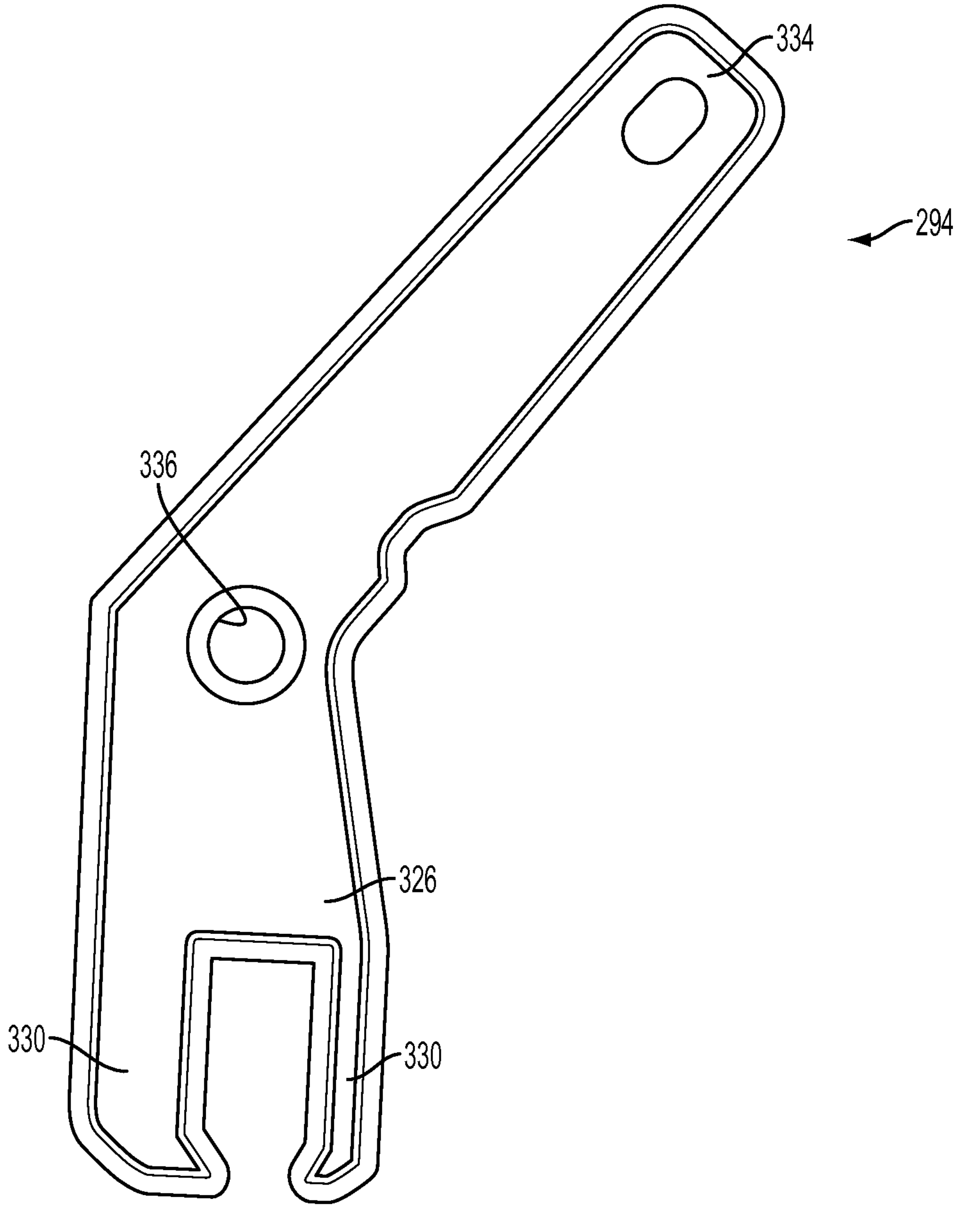
FIG. 15 is a front view of the fork arm of the elapsed time clock of FIG. 1.

Illustrated in FIG. 15, the fork arm 294 includes a first end 326, having a pair of fingers 330 spaced a distance apart to allow the input gear 222 to be positioned therebetween. The fingers 330 are operable, such that when the user adjusts the assembly 226 between the start time and end time configurations, the fingers 330 contact opposite sides of the input gear 222 to bias it axially along the protrusion 282 between the first and second positions. The fork arm 294 also includes a second end 334, opposite the first end 326 with respect to the pivot point 336 that is operatively coupled to the second end 314 of the input arm 290.

Figure 16:
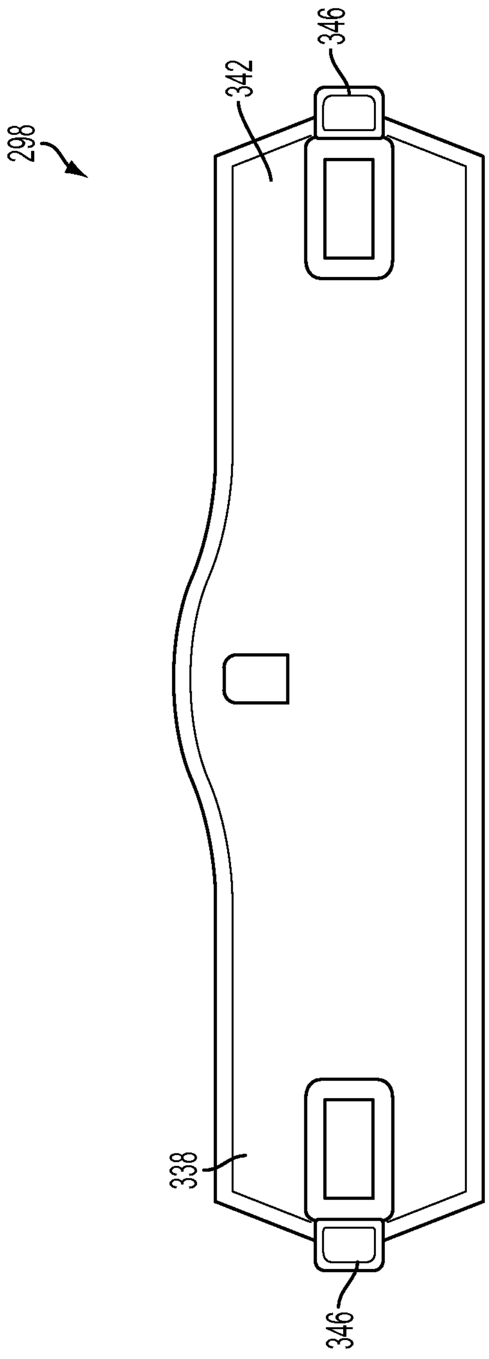
FIG. 16 is a front view of the locking arm of the elapsed time clock of FIG. 1.

Illustrated in FIG. 16. the locking bar 298 is substantially elongated in shape, having a first end 338 and second end 342, both of which include a locking protrusion 346 extending outwardly therefrom. Each locking protrusion 346 is sized to be received within a notch 154, 154' of the indexing gears 86, 86', respectively. More specifically, when the selector assembly 226 is in the start time configuration, the locking protrusion 346 of the first end 338 is positioned within one of the notches 154' of the indexing gear 86' of the end time assembly 22. The locking protrusion 346 restricts the indexing gear 86' from rotating with respect to the body 14. As a result, the user is unable to rotate the minute hand 74' with respect to the end clock 50. Similarly, when the selector assembly 226 is in the end time configuration, the locking protrusion 346 of the second end 342 is positioned within one of the notches 154 of the indexing gear 86 of the start time assembly 18, restricting the indexing gear 86 from rotating with respect to the body 14 and the user from rotating the minute hand 74.

Figure 17:
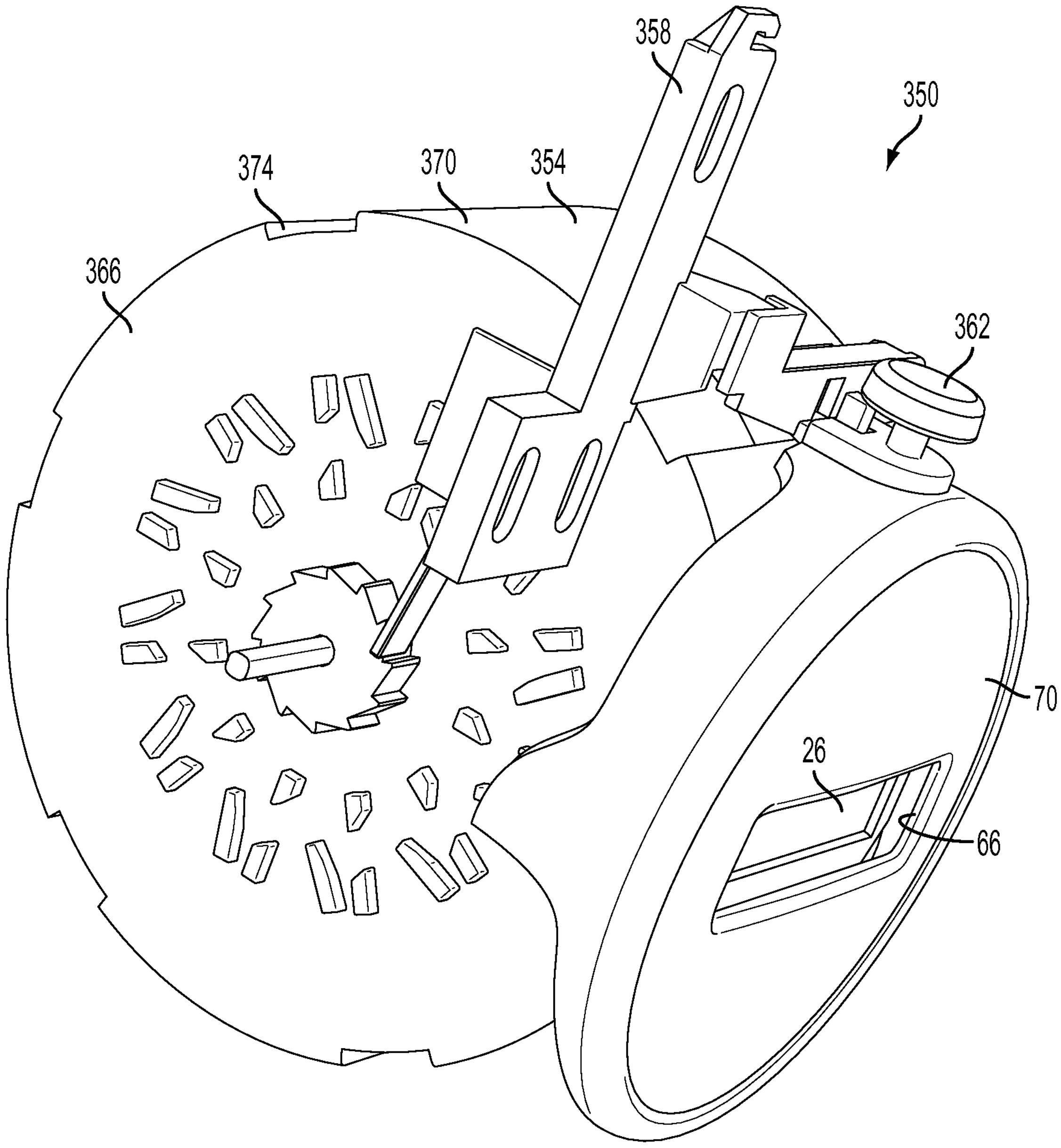
FIG. 17 is a perspective view of the shutter assembly of the elapsed time clock of FIG. 1.
Figure 18:
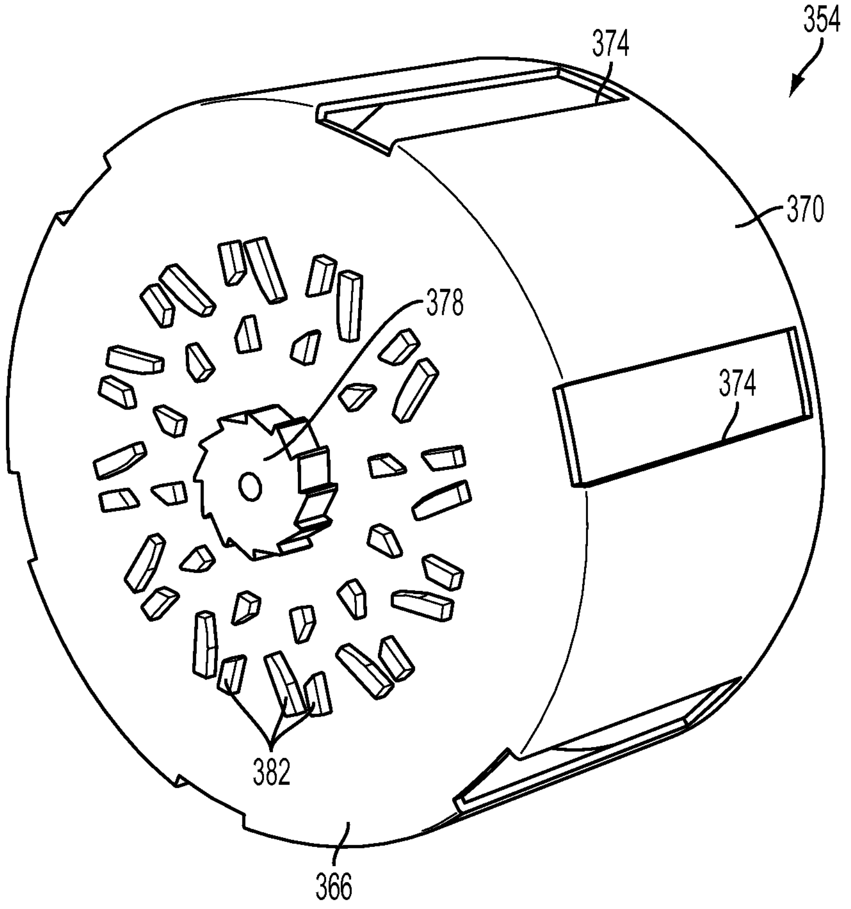
FIG. 18 is a perspective view of the cage of the shutter assembly of FIG. 17.

Illustrated in FIGS. 17 and 18, the clock assembly 10 also includes a shutter assembly 350 rotateably coupled to the elapsed time digital assembly 230 and configured to alternately shield and expose the indicia of the digital assembly 230 aligned with the third aperture 66. In the illustrated construction, the shutter assembly 350 includes a cage 354 substantially encompassing the dials of the digital assembly, and an actuator 358. When assembled, the actuator 358 is biased into a rested position by a biasing member or spring (not shown). The actuator 358 is in operable communication with a button 362, positioned outside the body 14, such that each time the user depresses the button 362, the actuator moves downwardly from the rested position in a substantially linear fashion. When the button 362 is released, the actuator 358 automatically returns to the rested position.

Best illustrated in FIG. 18, the cage 354 of the shutter assembly 350 is substantially cylindrical in shape, having a side wall 366, and an annular wall 370 extending from the side wall 366 to define a plurality (e.g., six) of apertures 374 therein. In the illustrated construction, the apertures 374 are spaced every 60 degrees and are sized to correspond with the third aperture 66 of the body 14.

The side wall 366 of the cage 354 includes a toothed wheel 378 and a plurality of ridges 382 each extending outwardly and positioned to interact with the actuator 358. When assembled, the ridges 382 and toothed wheel 378 work in tandem such that each time the actuator 358 moves linearly downwardly from the rested position (e.g., is actuated by the button 362, described above), the cage 354 rotates 30 degrees in a first direction. As such, each time the user depresses the button 362, the portion of the annular wall 370 positioned between the digital assembly 230 and the third aperture 66 alternates between an aperture 374 (e.g., visible) and the wall 370 (e.g., not visible).

The user may operate the clock assembly 10 in the following manner to determine the elapsed time between 12:25 AM (start time) and 1:05 AM (end time). In this particular example, the user will begin with the minute and hour hands of the start and end time assemblies 18, 22 in the 12 o'clock position. As such, the start and end time digital assemblies 94, 94' will both read "AM 12:00" and the elapsed time digital assembly will read "0:00."

The user first biases the knob 302 of the input arm 290 towards the end of the slot 306 closest to the end time clock 50. This places the selection assembly 226 in the end time configuration, which in turn positions the input gear 222 in the second position (e.g., to mesh with the end time input shaft 218) and locks the start time assembly 18.

The user then rotates the minute hand 74' of the end time assembly 22 clockwise until the clock face reads 1:05 (e.g., 13 clicks or 390 degrees). At the same time, the torque from the minute hand 74' is transferred to the end time digital assembly 94', via the driveshaft 90', causing the minute dial 174' to rotate 390 degrees in the first direction. As describe above, the resulting rotation ends with the end time digital assembly 94' displaying "AM 1:05."

Furthermore, the torque from the minute hand 74' is also transferred to the elapsed time assembly 26, via the end time input shaft 218, causing the minute dial 254 to rotate 390 degrees in the first direction. As described above, the resulting rotation causes the elapsed time digital assembly 230 to display "1:05."

The user then biases the knob 302 of the input arm 290 towards the end of the slot 306 closest to the start time clock 42. This moves the selection assembly 226 from the end time configuration to the start time configuration, which in turn positions the input gear 222 in the first position (e.g., to mesh with the intermediate gear 242 of the start time input shaft 214) and locks the end time assembly 22.

The user then rotates the minute hand 74 of the start assembly 18 until the start time clock face reads 12:25 (e.g., 5 clicks or 150 degrees). At the same time, the torque from the minute hand 74 is transferred to the start time digital assembly 94, via the drive shaft 90, causing the minute dial 174 to rotate 150 degrees in the first direction. As described above, the resulting rotation ends in the start time digital assembly 94 displaying "AM 12:25."

Furthermore, the torque from the minute hand 74 is also transferred to the elapsed time assembly 26, via the start time input shaft 214, causing the minute dial 254 to rotate 150 degrees in the second direction. As described above, the resulting rotation results in the elapsed time digital assembly 230 displaying "0:40." Stated differently, the minute dial 254 of the elapsed time assembly 26 is advanced 30 degrees each time the end time minute hand 74' is advanced 30 degrees, and retarded 30 degrees each time the start time minute hand 74 is advanced 30 degrees. Essentially, the minute dial was moved forward 13 units by the end clock, retarded 5 units by the start clock, resulting in an overall movement of +8 units or 40 minutes.

If the user hasn't already done so, the user may then press the button 362 above the stopwatch 70, to rotate the cage 354 and expose the elapsed time.

The invention claimed is:

1. A clock comprising:
- a body having a first clock face and a second clock face;
- a start time assembly at least partially positioned within the body and corresponding with the first clock face;
- an end time assembly at least partially positioned within the body and corresponding with the second clock face;
- an elapsed time assembly in mechanical communication with both the start time assembly and the end time assembly; and the elapsed time assembly for determining the difference between a start time of the start time assembly and an end time of the end time assembly.

2. The clock of claim 1, wherein the elapsed time assembly includes a dial with indicia thereon, and wherein adjusting one of the start time assembly or the end time assembly causes the dial to rotate.

3. The clock of claim 1, further comprising a selector assembly, and wherein the selector assembly is moveable between a first configuration and a second configuration, wherein in the first configuration the elapsed time assembly is in mechanical communication with the start time assembly and not in mechanical communication with the end time assembly, and wherein in the second configuration the elapsed time assembly is in mechanical communication with the end time assembly and not in mechanical communication with the start time assembly.

4. The clock of claim 3, wherein the end time assembly is locked in the first configuration.

5. The clock of claim 1, wherein the start time assembly includes a digital display.

6. The clock of claim 1, wherein the start time assembly is in mechanical communication with the elapsed time assembly by way of a gear train.

7. A clock comprising:
- an elapsed time assembly including an elapsed time dial with indicia thereon;
- a start time assembly in mechanical communication with the elapsed time assembly, the start time assembly having a first minute hand, and wherein clockwise movement of the first minute hand rotates the elapsed time dial in a first direction;
- an end time assembly in mechanical communication with the elapsed time assembly, the end time assembly having a second minute hand, and wherein clockwise movement of the first minute hand rotates the elapsed time dial in a second direction opposite the first direction; and the elapsed time assembly for determining the difference between a start time of the start time assembly and an end time of the end time assembly.

8. The clock of claim 7, further comprising a selector assembly, and wherein the selector assembly is moveable between a first configuration and a second configuration, wherein in the first configuration the elapsed time assembly is in mechanical communication with the start time assembly and not in mechanical communication with the end time assembly, and wherein in the second configuration the elapsed time assembly is in mechanical communication with the end time assembly and not in mechanical communication with the start time assembly.

9. The clock of claim 8, wherein the second minute hand is locked from rotation in the first configuration.

10. The clock of claim 7, wherein the start time assembly includes a digital display having a digital display dial with indicia thereon.

11. The clock of claim 10, wherein rotation of the first minute hand causes the digital display dial to rotate.

12. The clock of claim 7, further comprising a body having a first clock face proximate the first minute hand.

13. The clock of claim 12, wherein the body includes a second clock face adjacent to the second minute hand.

14. The clock of claim 7, wherein the first minute hand is in mechanical communication with the elapsed time dial by way of a first gear train.

15. The clock of claim 14, wherein the second minute hand is in mechanical communication with the elapsed time dial by way of a second gear train.

16. The clock of claim 15, wherein the elapsed time assembly further comprises an input gear, and wherein the input gear is moveable between a first position and a second position, wherein the input gear is meshed with the first gear train and not with the second gear train in the first position, and wherein the input gear is meshed with the second gear train and not the first gear train in the second position.

17. The clock of claim 16, wherein the second minute hand is locked when the input gear is in the first position.

18. A clock comprising:
- a body having a first clock face and a second clock face;
- an elapsed time assembly including an elapsed time dial with indicia thereon;
- a start time assembly in mechanical communication with the elapsed time assembly, the start time assembly having a first minute hand proximate the first clock face, and wherein clockwise movement of the first minute hand rotates the elapsed time dial in a first direction;
- an end time assembly in mechanical communication with the elapsed time assembly, the end time assembly having a second minute hand proximate the second clock face, and wherein clockwise movement of the first minute hand rotates the elapsed time dial in a second direction opposite the first direction;

a start time digital display in mechanical communication with the start time assembly;

an end time digital display in mechanical communication with the end time assembly;

a selector assembly, the selector assembly moveable between a first configuration and a second configuration, wherein in the first configuration the elapsed time assembly is in mechanical communication with the start time assembly and not in mechanical communication with the end time assembly, and wherein in the second configuration the elapsed time assembly is in mechanical communication with the end time assembly and not in mechanical communication with the start time assembly; and the elapsed time assembly for determining the difference between a start time of the start time assembly and an end time of the end time assembly.

* * * * *